United States Patent [19]

Thomas

[11] 4,269,762
[45] May 26, 1981

[54] POLYCARBONATE CONTAINING A SALT OF A TETRAHYDROCARBYL BORATE AS AN IGNITION DEPRESSANT

[75] Inventor: Lowell S. Thomas, Midland, Mich.

[73] Assignee: The Dow Chemical Company, Midland, Mich.

[21] Appl. No.: 142,328

[22] Filed: Apr. 21, 1980

[51] Int. Cl.³ .......................... C07F 5/02; C08K 5/50; C08K 5/55
[52] U.S. Cl. .......................... 260/45.7 P; 260/45.7 R; 260/45.9 R; 568/2
[58] Field of Search .......................... 260/45.7 R, 45.7 P, 260/45.9 R; 568/2

[56] References Cited

U.S. PATENT DOCUMENTS

| | | | |
|---|---|---|---|
| 3,321,435 | 5/1967 | Fritz et al. | 260/45.7 R |
| 3,475,372 | 10/1969 | Gable | 260/45.75 R |
| 3,530,164 | 9/1970 | Gillham et al. | 260/45.7 P |
| 3,689,601 | 9/1972 | Grayson et al. | 260/45.7 P |
| 3,836,490 | 9/1974 | Bockmann et al. | 260/45.7 R |
| 3,909,489 | 9/1975 | Callander | 260/45.7 R |
| 4,196,279 | 4/1980 | Azuma et al. | 260/45.7 R |

*Primary Examiner*—Maurice J. Welsh
*Assistant Examiner*—R. A. White

[57] ABSTRACT

A polycarbonate such as a bisphenol-A homopolycarbonate containing a small amount of a salt of a tetrahydrocarbyl borate e.g., sodium tetraphenyl borate, resists combustion upon exposure to a low temperature ignition source.

6 Claims, No Drawings

POLYCARBONATE CONTAINING A SALT OF A TETRAHYDROCARBYL BORATE AS AN IGNITION DEPRESSANT

DESCRIPTION OF THE INVENTION

This invention relates to polycarbonates containing additives which inhibit combustion upon exposure of the polycarbonates to low temperature ignition sources.

Polycarbonates derived from reactions of dihydroxy-organic compounds, particularly the dihydric phenols, and carbonic acid derivatives such as phosgene have found extensive commercial application because of their excellent physical properties. These thermoplastic polymers appear to be particularly suitable for the manufacture of molded parts wherein impact strength, rigidity, toughness, heat resistance and excellent electrical properties are required.

Unfortunately, however, these polymers exhibit a brief but definite burning time when contacted with an open flame or comparable low temperature ignition source. More importantly, as is often the case, the polycarbonates contain stabilizers and other additives which are often more combustible than the unmodified polycarbonate. As a result, the modified polycarbonate frequently exhibits substantially poorer resistance to combustion then does the unmodified polycarbonate.

In attempts to increase the combustion resistance of polycarbonates including modified forms thereof, it has been a common practice to employ monomeric phosphites, phosphoric acid esters, thiophosphoric acid esters containing halogenated alkyl radicals and halogenated organic compounds into the polycarbonate. However, in order to obtain any noticeable improvement in combustion resistance, these additives have been employed in such large quantities that they often adversely affect many of the desirable physical and mechanical properties of the polycarbonate.

More recently, for example, as taught in U.S. Pat. No. 3,919,167, various organo sulfonate salts have been employed as fire retardant additives for the polycarbonates. While these materials do not have a substantial deleterious effect on the physical properties of the polycarbonate, they generally must be employed in concentrations of at least one weight percent based on the polycarbonate in order to obtain a material that does not exhibit flaming drips upon combustion in accordance with Underwriter's Lab Standard Test UL-94.

In view of the deficiencies of conventional fire retardant polycarbonate compositions, it would be highly desirable to provide a polycarbonate composition having improved resistance to burning when exposed to a low temperature ignition source.

SUMMARY OF THE INVENTION

The present invention is a polycarbonate composition comprising a carbonate polymer having dispersed therein a thermally stable salt of a tetrahydrocarbyl borate (hereinafter this salt shall be called borate salt). The borate salt is present in an amount sufficient to retard combustion when the composition is exposed to a low temperature ignition source. Hereinafter, such composition shall be referred to as a fire retardant polycarbonate. The fire retardant polycarbonate of the present invention exhibits surprisingly high resistance to combustion and physical properties comparable to the carbonate polymer containing no borate salt.

The fire retardant polycarbonate of the present invention is suitably employed in most applications in which polycarbonates have been previously utilized. Applications of particular interest for the utilization of the fire retardant polycarbonates of this invention are as follows: automobile parts, e.g., air filters, fan housings, exterior components; housings for electrical motors, appliances, business and office equipment, photographic equipment, electrical switch boxes, electronic components, lighting and aircraft applications.

In general, such fire retardant polycarbonates are particularly useful in applications wherein the polycarbonate part is likely to be exposed to low temperature ignition sources.

DETAILED DESCRIPTION OF THE EMBODIMENTS

The carbonate polymers employed in the present invention are advantageously aromatic carbonate polymers such as the trityl diol carbonates described in U.S. Pat. Nos. 3,036,035; 3,036,037; 3,036,038 and 3,036,039; polycarbonates of bis(ar-hydroxyphenyl)-alkylidenes (often called bisphenol-A type diols) including their aromatically and aliphatically substituted derivatives such as disclosed in U.S. Pat. Nos. 2,999,835; 3,038,365 and 3,334,154; and carbonate polymers derived from other aromatic diols such as described in U.S. Pat. No. 3,169,121.

It is understood, of course, that the carbonate polymer may be derived from two or more different dihydric phenols or a copolymer of a dihydric phenol with a glycol or with a hydroxy or acid terminated polyester or with a dibasic acid in the event that a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,105,633 and 4,156,069. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

While any of the thermally stable salts of tetrahydrocarbyl borates are suitably employed in the practice of this invention, preferred borate salts are those represented by the formula:

$$MBR_4$$

wherein M is alkali metal and each R is individually hydrocarbyl such as alkyl, cycloalkyl or aryl. By "heat stable" is meant that the borate salt can be combined with or compounded into the carbonate polymer in the desired quantities by melt mixing techniques in mixing apparatuses such as a thermoplastic extruder wherein the carbonate polymer is converted to a heat plastified state during the dispersion of borate into the polymer. Such heat stable borates also can withstand the thermal conditions normally occurring during molding operations wherein the mixture of carbonate polymer and borate is melt processed using a conventional molding technique such as injection molding Typically, the temperatures normally existing during the aforementioned mixing and molding techniques are those which are sufficient to convert the carbonate polymer to a heat plastified state but not enough to cause thermal degradation of the polymer, e.g., usually within the range of from 300° to about 325° C. More preferably, M is sodium or potassium and R is aryl, especially phenyl. The most preferred borate salt is sodium tetraphenyl borate. Other borate salts suitably employed include sodium tetramethyl borate, potassium tetraethyl borate, lithium dimethyl (dibenzyl) borate, cesium tetra(o-tolyl)borate and the like as well as nonmetallic borate salts such as tetrahydrocarbyl phosphonium or ammonium salts of tetrahydrocarbyl borates, e.g., methyl triphenylphosphonium tetraphenyl borate. The borate salts are employed in particulate or powder form wherein the average particle diameter is preferably less than 5 micrometers, most preferably, less than one micrometer.

Methods for preparing the borate salts suitably employed in the practice of this invention are described in Kirk-Othmer, *Encyclopedia of Chemical Technology*, 2d Edition, Vol. 3, p. 713 (1967).

The fire retardant polycarbonate of the present invention is suitably prepared by combining the carbonate polymer with an effective amount of borate salt using (0.32 cm (dia)×0.32 cm (length)) is added 0.15 g of the sodium tetraphenyl borate ($NaB(C_6H_5)_4$). An aqueous solution of the borate salt is combined with the polycarbonate by spraying it onto the polycarbonate pellets which have been preheated to 250° F. The sprayed pellets are then dried at 250° F. for 4 hours. The resultant blend is extruded and repelletized in a single screw extruder equipped with a static mixer and operating at 525° F. The extruded pellets are redried at 250° F. for up to 4 hours. These redried pellets are molded into test bars (12.7 cm×1.27 cm×0.32 cm) using a screw type injection molding unit wherein the molding temperature is 550° F. The injection molded bars are tested for combustibility (oxygen index and fire retardance) and for optical properties (light transmission and haze). The results of these tests (Sample No. 1) are reported in Table I.

For the purposes of comparison, three additional blends (Sample Nos. 2–4) are prepared using different amounts of $NaB(C_6H_5)_4$. These blends are also tested and the results are reported in Table I. Also recorded in Table I are the combustibility and optical properties of a control sample (Sample No. C) employing no fire retardant additive.

TABLE I

| Sample No. | Borate Salt Amount(1), % | $O_2$ Index(2) % $O_2$ | Flame Retardance(3) Flame Time, sec. | Rating | Light Transmission(4), % | Haze(5) % |
|---|---|---|---|---|---|---|
| 1 | 0.005 | 30.6 | 12.4 | V-2, V-2 | Not Determined | Not Determined |
| 2 | 0.010 | 36.1 | 4.2 | V-0, V-0 | 88.3 | 2.1 |
| 3 | 0.050 | 41.0 | 1.5 | V-0, V-0 | 80.8 | 4.8 |
| 4 | 0.100 | 43.7 | 2.8 | V-0, V-0 | Not Determined | Not Determined |
| C* | — | 25.2 | 17.5 | HB, HB | 88.8 | 1.3 |

*Not an example of the invention.
(1)Amount - weight percent based on polycarbonate
(2)ASTM D-2863-70
(3)Underwriters Laboratories Standard Test UL-94
(4)ASTM D-1003-61
(5)ASTM D-1003-61 any one of a variety of blending procedures conventionally employed for incorporating additives into carbonate polymer resins. For example, dry particulates of the carbonate polymer and the borate salt may be dry blended and the resulting dry blend extruded into the desired shape.

While any amount of borate salt that imparts to the polycarbonate an improved resistance to ignition and/or combustion is suitable, preferred amounts of the borate salt are in the range from about 0.001 to about 0.5, especially from about 0.01 to about 0.10, weight percent based on the weight of the polycarbonate.

In addition to the aforementioned borate salts, other additives may be included in the fire retardant polycarbonate of the present invention such as other fire retardant additives, fillers, pigments, dyes, antioxidants, stabilizers, ultraviolet light absorbers, mold release agents and other additives commonly employed in polycarbonate resin formulations.

The following examples are given to further illustrate the invention and should not be construed as limiting its scope. In the following examples, all parts and percentages are by weight unless otherwise indicated.

EXAMPLE 1

To a 3000-g sample of a homopolycarbonate of bisphenol-A, having a weight average molecular weight ($M_w$) of 32,000 as determined by gel permeation chromatography and sold under the trade name, Merlon M50F-1000 by Mobay Chemical, in the form of pellets As evidenced by the data shown in Table I, the borate salts such as $NaB(C_6H_5)_4$ impart significant fire retardance to polycarbonates even at low levels, e.g., 0.005–0.1%, wherein optical properties are not significantly affected.

EXAMPLE 2

A 5-g portion (0.1 percent) of methyl triphenylphosphonium tetraphenyl borate is dry blended with 5000 g of a homopolycarbonate of bisphenol A (Novarex 7025PJ sold by Mitsubishi Chemical Industries, Ltd., Tokyo, Japan) at 250° F. for 4 hours. The resulting blend is melt blended in a screw extruder and extruded into pellets. The pellets are dried and injection molded into test bars having a thickness of 0.32 cm. The test bars (Sample No. 1) are aged at 72° F. and 50 percent relative humidity for 48 hours and then tested for combustibility and optical properties by test methods described in Table I. The polycarbonate containing no borate salt is similarly tested. The results are reported in Table II.

TABLE II

| Sample No. | $O_2$ Index(2), % $O_2$ | Flame Retardance Rating(3) | Light Transmission(4) % | Haze(5) % |
|---|---|---|---|---|
| 1 | 37.1 | V-2, V-2 | 83.5 | 2.5 |

TABLE II-continued

| Sample No. | O₂ Index(2), % O₂ | Flame Retardance Rating(3) | Light Transmission(4) % | Haze(5) % |
|---|---|---|---|---|
| C* | 29.1 | HB, HB | 86.4 | 1.4 |

*Not an example of the invention.
(2)-(5)Same as in Table I.

What is claimed is:

1. A composition comprising a carbonate polymer having dispersed therein a thermally stable salt of a tetrahydrocarbyl borate in an amount sufficient to retard combustion when the composition is exposed to a low temperature ignition source.

2. The composition of claim 1 wherein the salt is represented by the formula:

$$MBR_4$$

wherein M is alkali metal; each $R_4$ is individually aryl or alkyl.

3. The composition of claim 2 wherein M is Na or K and each R is individually aryl.

4. The composition of claim 3 wherein the salt is sodium tetraphenyl borate and is present in an amount from about 0.02 to about 0.1 weight percent of the carbonate polymer.

5. The composition of claim 1 wherein the salt is a tetrahydrocarbyl phosphonium tetrahydrocarbyl borate.

6. The composition of claim 5 wherein the salt is methyl triphenylphosphonium tetraphenyl borate.

* * * * *